US006778946B1

(12) United States Patent
Chang et al.

(10) Patent No.: US 6,778,946 B1
(45) Date of Patent: Aug. 17, 2004

(54) METHODS AND APPARATUS FOR PROCESSING RANKED FUZZY CARTESIAN QUERIES

(75) Inventors: Yuan-Chi Chang, White Plains, NY (US); Chung-Sheng Li, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 09/690,378

(22) Filed: Oct. 17, 2000

(51) Int. Cl.[7] ............................................... G06F 17/27
(52) U.S. Cl. .................... 703/2; 703/6; 703/8; 703/52; 703/900
(58) Field of Search ............................. 703/2; 706/900, 706/52, 46, 8, 4; 707/3, 5, 6; 708/422

(56) References Cited

U.S. PATENT DOCUMENTS

| 5,046,019 A | * | 9/1991 | Basehore ........................ 706/1 |
| 5,272,657 A | * | 12/1993 | Basehore et al. ........... 708/422 |
| 5,606,646 A | * | 2/1997 | Khan et al. ...................... 706/2 |
| 6,078,911 A | * | 6/2000 | Bonissone et al. ............. 706/52 |
| 6,453,246 B1 | * | 9/2002 | Agrafiotis et al. ............. 702/27 |

OTHER PUBLICATIONS

M. Flickner et al., "Query by Image and Video Content: The QBIC System," IEEE, pp. 23–32, Sep. 1995.
J.R. Bach et al., "The Virage Image Search Engine: An Open Framework for Image Management," SPIE, vol. 2670, pp. 76–87, 1996.
A. Pentland et al., "Photobook: Tools for Content–Based Manipulation of Image Databases," SPIE Image and Information Systems, vol. 2368, pp. 37–50, 1994.
B.S. Manjunath et al., "Texture Features for Browsing and Retrieval of Image Data," IEEE Transactions on Pattern Analysis and Machine Intelligence, vol. 18, No. 8, pp. 837–842, Aug. 1996.
M. Beatty et al., "Dimensionality Reduction Using Multi–Dimensional Scaling for Content–Based Retrieval," IEEE, pp. 835–838, 1997.
C.–S. Li et al., "Progressive Content–Based Retrieval from Distributed Image/Video Databases," IEEE International Symposium on Circuits and Systems, pp. 1484–1487, 1997.

\* cited by examiner

*Primary Examiner*—Albert W. Paladini
(74) *Attorney, Agent, or Firm*—Thu Ann Dang; Ryan, Mason & Lewis, LLP

(57) ABSTRACT

Ranked fuzzy cartesian queries request top-K composite objects in a multimedia database. These composite objects, comprising multiple simple objects with their relations specified, are ranked by a fuzzy AND score of individual object properties and their fuzzy relations. Ranked fuzzy cartesian queries appeared in many different applications but were not fully exploited because of high computational complexity. In accordance with the present invention, methods and apparatus are provided for preprocessing a ranked fuzzy cartesian query to prune candidates which will not appear in the final top-K composite objects. Algorithms for processing queries against two simple objects and against three or more simple objects are separately described. These algorithms use a bound-and-prune technique to determine the candidates which can be removed from the search space. Disclosed methods are guaranteed to have no false dismissal.

23 Claims, 11 Drawing Sheets

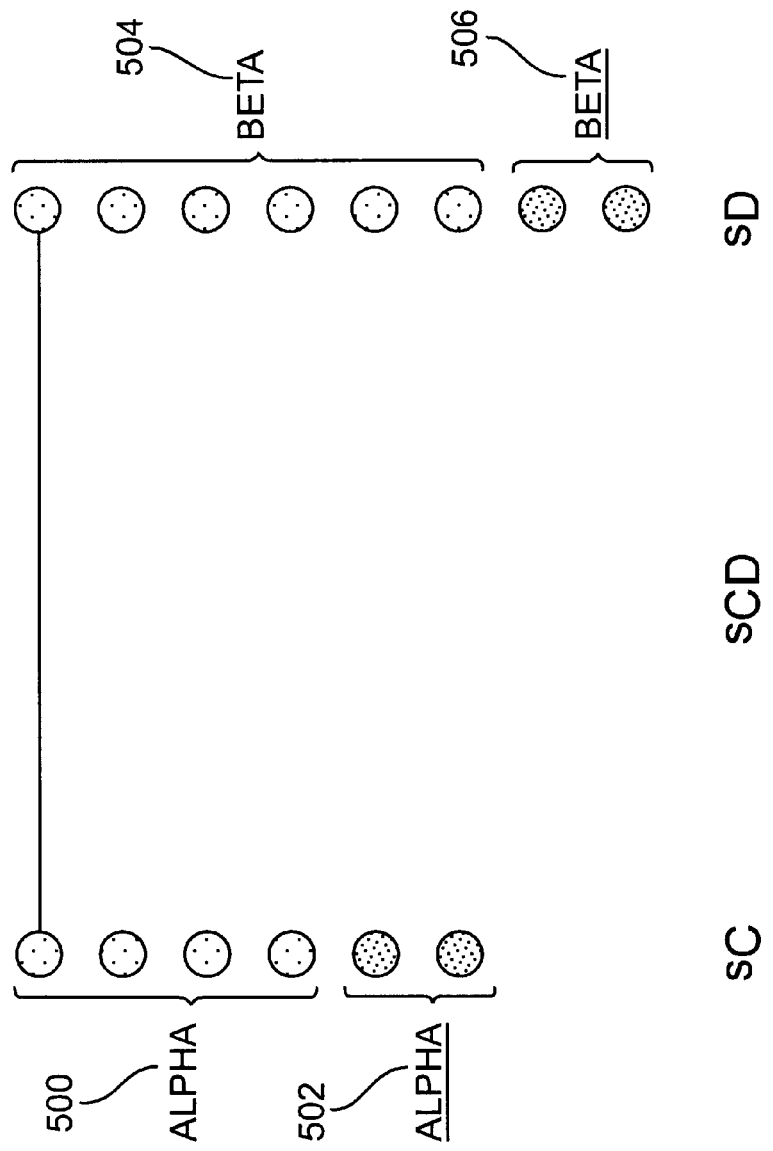

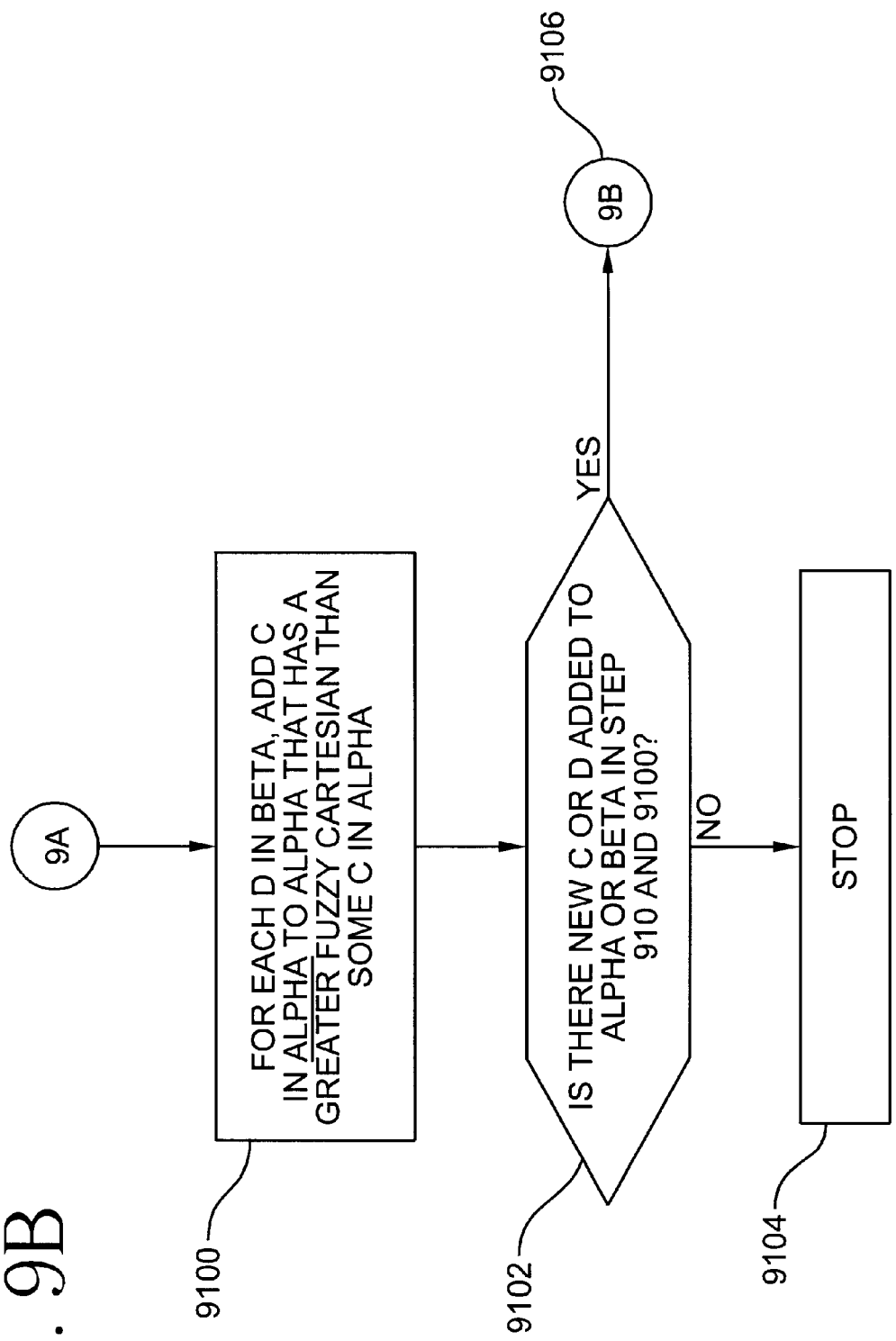

METHODS AND APPARATUS FOR PROCESSING RANKED FUZZY CARTESIAN QUERIES

The U.S. Government has a paid-up license in this invention and the right in limited circumstances to require the patent owner to license others on reasonable terms as provided for by the terms of contract no. NCC5-305 awarded by NASA/CAN.

FIELD OF THE INVENTION

The present invention relates to multimedia database systems and, more particularly, to query processing operations of composite multimedia objects. The invention provides an algorithm which prunes the search space by filtering multimedia objects in a ranked fuzzy cartesian query.

BACKGROUND OF THE INVENTION

A composite object in a multimedia database is specified by a set of simple objects and the relationships among them. Each of the simple objects is characterized by one or many of its feature, spatial, temporal and semantic attributes. Relationships among simple objects can be spatial or temporal. Using an image database as an example, an image object may be defined by its color, shape, texture, or size. Relationships between two objects may be characterized using spatial relations such as "on top of," "near," or "to the west of." As an example, one may define a composite object consisting of a "red," "round" image object "within" a "large," "white" image area. This composite object is then used to search for images matching its description, such as one with a red beach ball on a white-sand beach. In the above example, "red," "round," "large" and "white" characterize features of simple objects. "Within" defines the spatial relationship between the two simple objects.

In a multimedia database, object attributes and relationships are generally defined in fuzzy specifications and searches are targeted at retrieving top-K ranked objects in similarity, often known as a similarity search. For example, a search may involve searching for simple image objects which look "red" and "round." The property "red" is measured by a fuzzy score on how close its color attribute is to "red." The property "round" is measured by a fuzzy score on how close its shape attribute is to "round." The overall score of the image object is calculated by taking a "fuzzy AND" operation of the two individual property scores. Objects with their total scores ranked among the top-K are retrieved. Searches for composite objects are evaluated in a similar fashion, with the addition of fuzzy scores measuring object relationships.

While there have been extensive studies on querying simple objects, much less research is performed on processing composite objects. A composite object query involves evaluations of fuzzy cartesian products of the simple objects.

The present invention addresses a key issue in composite object queries, which is the reduction of the number of simple objects participating in evaluations of fuzzy cartesian products. Since fuzzy cartesians involve a lot of computation and disk retrieval, the smaller the number, the faster the query processing. The algorithm described in this invention guarantees the filtering of candidate objects does not cause any false dismissal. Top-K ranked composite objects retrieved from the filtered set of objects will be the same as those without filtering.

Techniques in retrieving image or video objects by their content features have progressed significantly in recent years. The cited publications below address indexing and query processing of similarity searches on simple objects, which may be characterized by multiple features. Related works include the IBM Query by Image Content (QBIC) system (M. Flickner et al., "Query by image and video content: The (QBIC) system," IEEE Computer, 28(9):23–32, September 1995), the Virage visual information retrieval system (J. R. Bach et al., "Virage image search engine: an open framework for image management," Symposium on Electronic Imaging: Science and Technology—Storage & Retrieval for Image and Video Databases (IV), volume 2670, pages 76–87, 1996), the MIT Photobook (A. Pentland et al., "Tools for content-based manipulation of image databases," Proceedings of the SPIE Storage and Retrieval Image and Video Databases II, February 1994), the Alexandria project at UCSB (B. S. Manjunath et al., "Texture features for browsing and retrieval of image data," IEEE Trans. Pattern Analysis Machine Intell. Special Issue on Digital Libraries, (8), 1996, and M. Beatty et al., "Dimensionality reduction using multidimensional scaling for image search," Proc. IEEE International Conference on Image Processing, October 1997) and the IBM/NASA Satellite Image Retrieval System (C.-S. Li et al., "Progressive content-based retrieval from distributed image/video databases," Proceeding of the International Symposium of Circuit and System, IEEE, 1997).

In recent years, the increasing importance for multimedia databases to provide search capabilities for not only simple but also composite objects has been recognized. Practical applications for composite object queries arise in both scientific and engineering disciplines. For example, they include:

Environmental epidemiology: Retrieve locations of houses which are vulnerable to epidemic diseases such as Hantavirus and Denge fever based on a combination of environmental factors (e.g., isolated houses that are near bushes or wetlands), and weather patterns (e.g., a wet summer followed by a dry summer).

Precision farming: (1) Retrieve locations of cauliflower crop developments that are exposed to clubroot, which is a soil-borne disease that infects cauliflower crop. Cauliflower and clubroot are recognized spectral signatures, and exposure results from their spatial and temporal proximity. (2) Retrieve those fields which have abnormal irrigation, (3) Retrieve those regions which have higher than normal soil temperature.

Precision forestry: (1) Calculate areas of forests that have been damaged by hurricane, forest fire, or storms. (2) Estimate the amount of the yield of a particular forest.

Petroleum exploration: Retrieve those regions which exemplify specific characteristics in the collection of seismic data, core images, and other sensory data.

Insurance: (1) Retrieve those regions which may require immediate attention due to natural disasters such as earthquake, forest fire, hurricane, and tornadoes. (2) Retrieve those regions having higher than normal claim rate (or amount) that are correlated to the geography—close to coastal regions, close to mountains, in high crime rate regions, etc.

Medical image diagnosis: Retrieve all MRI images of brains that have tumors located within the hypothalamus. The tumors are characterized by shape and texture, and the hypothalamus is characterized by shape and spatial location within the brain.

Real estate marketing: Retrieve all houses that are near a lake (color and texture), have a wooded yard (texture) and are within 100 miles of skiing (mountains are also given by texture).

While composite object queries may be processed by evaluating each and every possible combination of fuzzy cartesian products, the computational complexity of this simple scan method is on the order of $O(L^N)$, where a composite object is defined by the relationships of N simple objects in a database of L candidates. In a recently filed patent application, the inventors described an algorithm to reduce the computational complexity to the order of $O(K*N*L^2)$, assuming top-K ranked composite objects are requested, see U.S. patent application identified as Ser. No. 09/237,734 filed on Jan. 26, 1999 in the names of Chung-Sheng Li et al. and entitled "System and method for sequential processing of content-based retrieval of composite objects," the disclosure of which is incorporated by reference herein. A key idea behind the above-referenced Li et al. patent application is the observation that if the query only asked for top-K objects, at each node of the fuzzy cartesian, only K paths need to be kept, instead of L. As a result, the composite object query problem becomes much more tractable. However, there is still room for improvements since L is typically a large number exceeding 1,000.

A main contribution of the present invention is to further reduce the computational complexity to the order of $O(K*N*M^2)$, where M is a number less than or equal to L. The actual value of M is found through an algorithmic procedure detailed below in accordance with some illustrative embodiments of the present invention.

SUMMARY OF THE INVENTION

The present invention provides methods and apparatus for pruning the search space of simple multimedia objects involved in a ranked fuzzy cartesian query of composite objects. Particular aspects of the present invention are related to: (1) converting a query with a fuzzy specification of one or more simple objects and spatial or temporal relationships among them into a set of subgoals; (2) removing candidates in each subgoal which will not be part of the final top-K ranked composite; and (3) returning remaining candidates for fuzzy cartesian evaluation.

It is to be appreciated that a subgoal is the pairwise relationship between two simple objects specified in the query. The full fuzzy specification can be abstractly viewed as a graph of nodes and edges, where nodes represent simple objects and edges connecting the nodes represent subgoals. A simple object is an abstract notion or concept used in a query to describe the characteristics of a physical entity, e.g., car. Candidate objects or, more simply, candidates are the materialization of the object abstraction, e.g., Camry, Accord, and Explorer.

The present invention speeds up the query processing part on cartesian evaluation at the expense of pre-processing to prune the search space. Depending on the number of simple objects defined in the composite object query as well as distributions of their fuzzy scores, the speedup can be as much as several thousand fold. It should also be noted that in the worst case, there can be no speedup. However, since the computational overhead of pruning simple objects is small compared to the evaluation of a fuzzy cartesian, it is advisable to apply the algorithm in all circumstances.

The invention discloses two algorithms, the first of which prunes objects in a two-object fuzzy cartesian query and the second of which prunes objects in a query involving three or more objects. The two cases are treated separately because sufficient conditions to guarantee no false dismissal are less stringent in two-object queries. Less stringent conditions lead to a smaller pruned set of objects for cartesian evaluation, thereby increasing the processing speedup.

The two algorithms disclosed in the invention are applicable to any "upward closed" fuzzy AND operators. A fuzzy AND operator is a mapping of a vector of fuzzy scores to a single score. A fuzzy AND operator, f, is "upward closed" if and only if a vector X strictly greater than Y element wise implies f (X)>f (Y). Commonly used fuzzy AND operators such as minimum and weighted sum are "upward closed." Note that the reverse is generally not true. That is, f(X)>f(Y) does not imply X strictly greater than Y element wise. The fuzzy AND operator takes the fuzzy scores of simple objects as well as their fuzzy relations as its argument. For example, a commonly used fuzzy AND operator is a linearly weighted sum. The fuzzy score of a composite multimedia object is then computed as a linearly weighted sum of fuzzy scores of simple objects and fuzzy relations. Weights assigned to each element may depend on applications and do not affect the algorithms described in this invention.

The first algorithm (two-object pruning algorithm) prunes the search space of composite objects comprising two simple objects. The algorithm first establishes a lower bound of the Kth largest composite object by making use of a sorted list of fuzzy relations between the two simple objects. This lower bound is then used to remove the set of candidates which have no opportunity to appear in the final top-K composites.

The second algorithm (multi-object pruning algorithm) prunes the search space of composite objects comprising three or more objects. The algorithm first divides the query into a set of subgoals, each of which is comprised of two simple objects and their fuzzy relation. Simple objects are pruned in each subgoal by using the first algorithm with additional constraints. When the subgoals are re-assembled, pruned objects may be selectively added back so that no false dismissal occurs.

The second algorithm is a realization of a set of sufficient conditions for object pruning. The set of sufficient conditions guarantee that for any path connecting pruned (removed) objects, there will be at least K paths in the remaining sets of objects having greater values. One can prove that any algorithm that performs a procedure satisfying the set of sufficient conditions will guarantee no false dismissal.

These and other objectives, features and advantages of the present invention will become apparent from the following detailed description of illustrative embodiments thereof, which is to be read in connection with the accompanying drawings.

BRIEF DESCRIPTION OF THE DRAWINGS

FIG. 5 is a graphical illustration of a contribution of the present invention, which prunes candidate lists;

FIGS. 9A and 9B provide a flow diagram of the pruning procedure of multiple objects according to an embodiment of the present invention.

DETAILED DESCRIPTION OF PREFERRED EMBODIMENTS

It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., keyboard, for making queries and/or inputting data to the processing unit, and/or one or more output devices, e.g., CRT display and/or printer, for presenting query results and/or other results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 1:
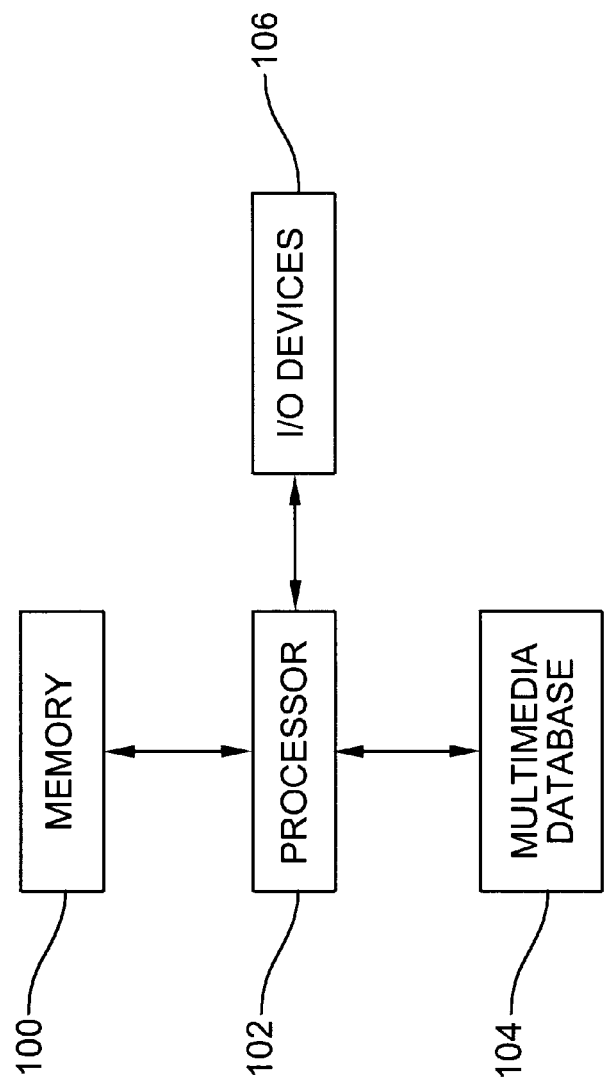
FIG. 1 is a block diagram of an exemplary hardware architecture for use with the methodologies of the present invention.

First, an exemplary hardware architecture for processing fuzzy cartesian queries formed in accordance with the invention is described in the context of FIG. 1. FIG. 1 illustrates an apparatus according to the invention which may be used for pruning the search space of fuzzy cartesian queries. The fuzzy cartesian query may involve two or more objects with properties and relations characterized by fuzzy scores. The apparatus includes a processor 102 coupled to memory 100, I/O devices 106, and multimedia database store 104. It is to be appreciated that the processor 102 controls and/or performs the methodologies, e.g., search space pruning algorithms associated with the invention. Memory 100 is used by the processor 102 in performing such operations, e.g., storing a list of objects returned by the processor in response to a particular query. I/O devices 106 may include a keyboard, a mouse, and/or any conventional data input device which permits a user to enter queries and/or other data to the system. I/O devices 106 may also include a display, printer, and/or any conventional data output device which permits a user to observe results associated with queries and/or other processor operations. Multimedia database store 104 may contain multimedia objects indexed by features such as texture, color, and semantic. In such a configuration, the processor 102 accesses the database store 104 in response to a user query.

It is also to be appreciated that the invention may be implemented on more than one such computer system shown in FIG. 1. For example, in a client-server arrangement, the user may enter a query at a client computing device which is connected to a server via a network (e.g., Internet or World Wide Web). The server then performs the search space pruning and query evaluation processes of the invention in accordance with the input query and the multimedia database. The server then returns results to the client computing device via the network. One of ordinary skill in the art will realize many other computer system arrangements for implementing the teachings of the present invention.

Figure 2:
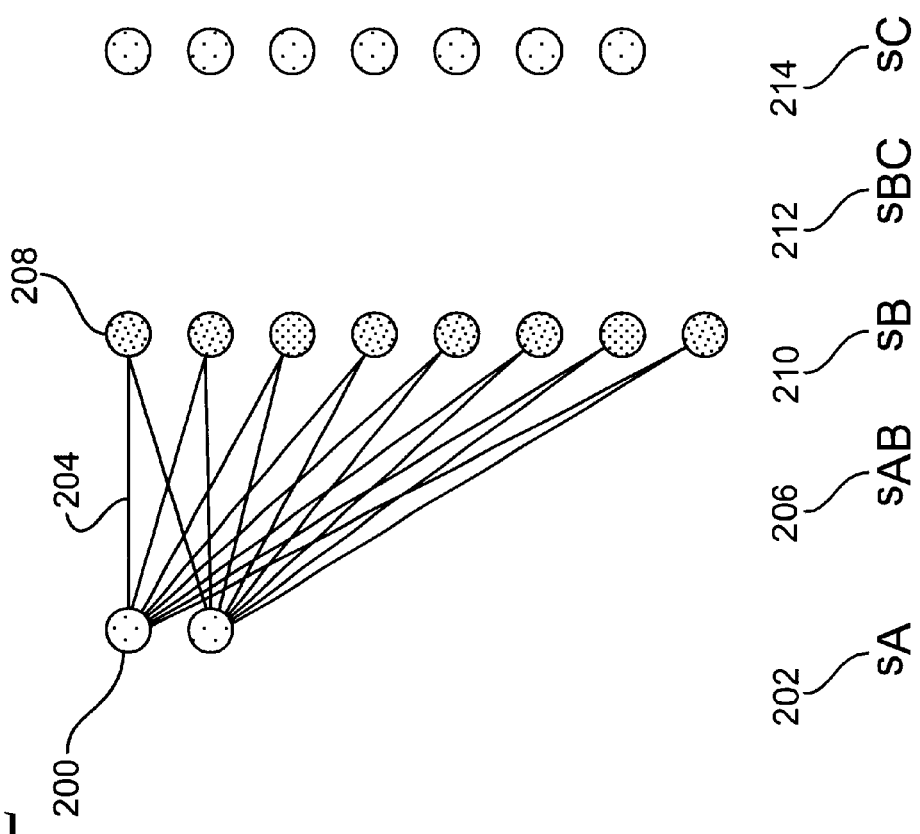
FIG. 2 is a graphical illustration of the fuzzy cartesian problem discussed in accordance with the present invention.

FIG. 2 illustrates an example of a fuzzy cartesian problem discussed in accordance with the present invention. In this example, there are three objects A (202), B (210) and C (214). For each object, there is a list of candidates showing as a column of dots there above in FIG. 2. There are two candidates (drawn as dots) in object A's list, eight candidates in object B's list, and seven candidates in object C's list. The first candidate in object A's list is marked 200. The first candidate in object B's list is marked 208. The line between dot 200 and dot 208 is marked 204. This line (204) symbolizes the relationship between candidate 200 and 208. As previously explained, candidates are the materialization of the abstract "object" concept. They carry attributes and for each attribute, there is a fuzzy score associated with it. The fuzzy score measures how well a candidate represents the abstract "object" concept.

For reasons of clarity, FIG. 2 does not illustrate all relations between candidates of A, B, and C. FIG. 2 only shows all possible relations between candidates of A and B. For any candidate in A's list, it has a link to every candidate in B's list. What is not drawn in FIG. 2 is that for any candidate in B's list, it has a link to every candidate in C's list. A full enumeration of the 3-tuples has the size 2*8*7= 112.

In FIG. 2, both the dots and the links between dots are associated with fuzzy metrics. A dot is associated with a fuzzy score, which measures how similar a candidate is to the query object. In FIG. 2 and later drawings, a fuzzy score associated with a query object X is denoted as sX. A link between two dots is associated with a fuzzy relation score, which measures how similar a fuzzy relation between two candidates is to the queried relation between two query objects. In FIG. 2 and later figures, a fuzzy relation score associated with the queried relation between two query objects X and Y is denoted as sXY. In FIG. 2, sA (202), sB (210), sC (214) are fuzzy scores while sAB (206) and sBC (212) are fuzzy relation scores.

The goal of a top-K fuzzy cartesian query is to retrieve the tuples whose fuzzy composite scores are ranked top-K. The composite score of a tuple is calculated by the fuzzy AND of all object scores and relation scores. Assume a linearly weighted sum is used to compute fuzzy AND. In the example illustrated in FIG. 2, the composite score is computed by the weighted sum of sA, sAB, sB, sBC, and sC. In general, all weights and scores are positive.

Figure 3:
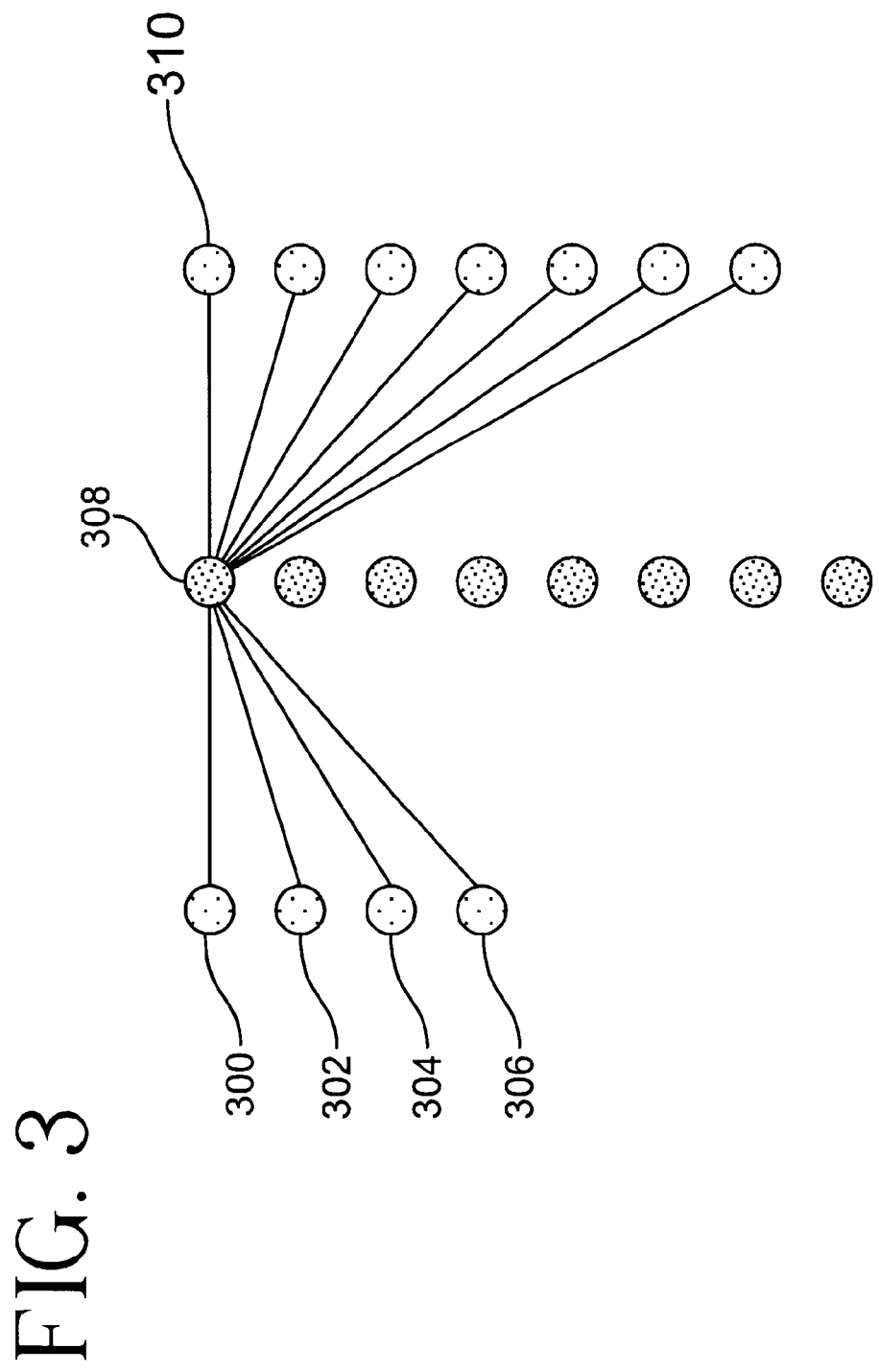
FIG. 3 is a graphical illustration of a three-object fuzzy cartesian problem.

FIG. 3 illustrates a three-object fuzzy cartesian problem with all cartesian tuples involving candidate 308 marked. In the rest of the illustrative embodiment, we use the term "path" to describe a connection of dots and links from the first object list to the last object list. Two dots in the same path cannot appear in the same object list, thereby preventing a loop in the path. In FIG. 3, a connection from 300, to 308, then to 310 is a path. A connection from 306, to 308, then to 310 is also a path. A connection from 300, to 308, then to 304 is not a path. A path corresponds to a cartesian tuple and vice versa. We define the metric of a path as the composite score of the corresponding cartesian tuple.

Following the discussion in FIG. 2, there are a total number of 224 paths in FIG. 3. There are 28 paths passing dot 308. Again, for reasons of clarity, not all paths are shown.

It is not uncommon for a candidate list of a multimedia object to have several thousand candidates. A straightforward enumeration generates P paths, where P is equal to the multiplication of the sizes of the candidate lists. The computational complexity is thus on the order of $O(L^N)$, where N is the number of simple objects involved and each has a candidate list of length L. Here, we assume the fuzzy cartesian of N simple objects is described in the form shown FIG. 2.

Fortunately, $O(L^N)$ is not the best one can do. As mentioned above, in the above-referenced U.S. patent application identified as Ser. No. 09/237,734, the inventors described an algorithm to reduce the computational complexity to the order of $O(K*N*L^2)$, by performing path pruning. A key idea behind the above-referenced patent application is the observation that if the query only asks for top-K objects, at each dot, only K paths need to be kept, instead of L.

Figure 4:
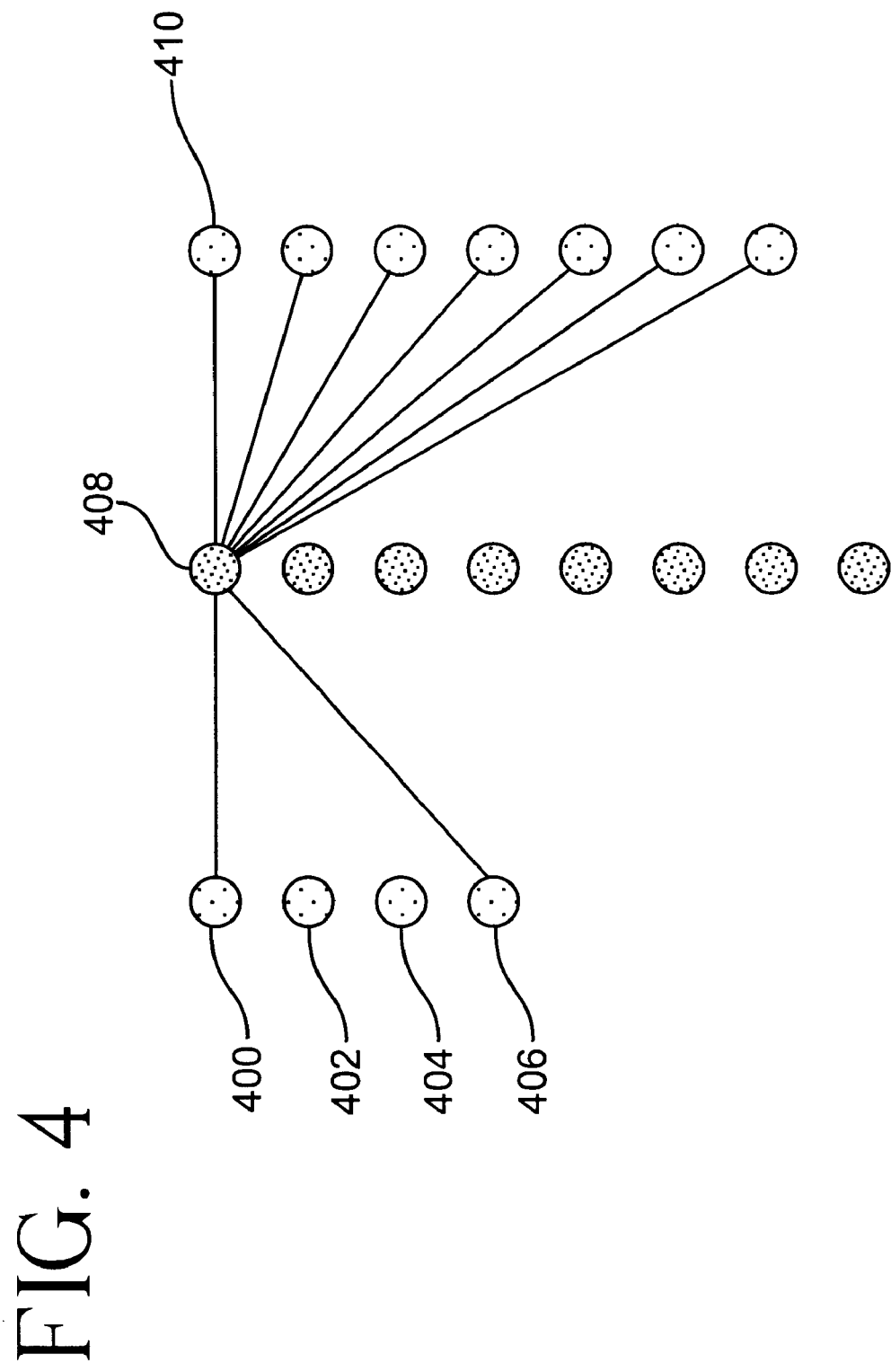
FIG. 4 is a graphical illustration of the problem depicted in FIG. 3 after path pruning of certain links.

FIG. 4 illustrates an example of path pruning. Specifically, FIG. 4 is a graphical illustration of the problem depicted in FIG. 3 after path pruning of certain links. Assume K is equal to 2. FIG. 4 depicts the remaining links after path pruning at dot 408. Links between 402 and 408 as well as 404 and 408 have been removed. A main contribution of the above-referenced U.S. patent application identified as Ser. No. 09/237,734 is to use path pruning to reduce the computational complexity of fuzzy cartesian queries.

FIG. 5 illustrates a contribution of the present invention, which prunes candidate lists. The present invention may be used in conjunction with the above-referenced U.S. patent application identified as Ser. No. 09/237,734 for solving the cartesian problem. A focus of the present invention is to reduce the number of candidates, rather than reducing the number of paths as in the above-referenced U.S. patent application identified as Ser. No. 09/237,734. FIG. 5 shows an example of a two-object cartesian problem. The candidate list of object C has six candidates. The list of object D has eight candidates. The algorithms described in accordance with the present invention partition a candidate list into two sets. Candidates in the first set will remain for cartesian evaluations. Candidates in the second set are pruned and removed since neither they nor the paths passing them will appear in the final top-K paths. In FIG. 5, the algorithm partitions C's list into set ALPHA (500), which contains four candidates, and set ALPHA (502), which contains two candidates. Similarly, D's list is partitioned into BETA (504) and BETA (506).

We assume that efficient retrieval techniques exist to locate and order objects and relations by their fuzzy scores. By efficient technique, we mean no linear scan of the whole database is required. Many similarity retrievals use special indexing structures to achieve high efficiency and those indexing structures are outside the scope of this invention. References can be found in the aforementioned publications.

Figure 6A:
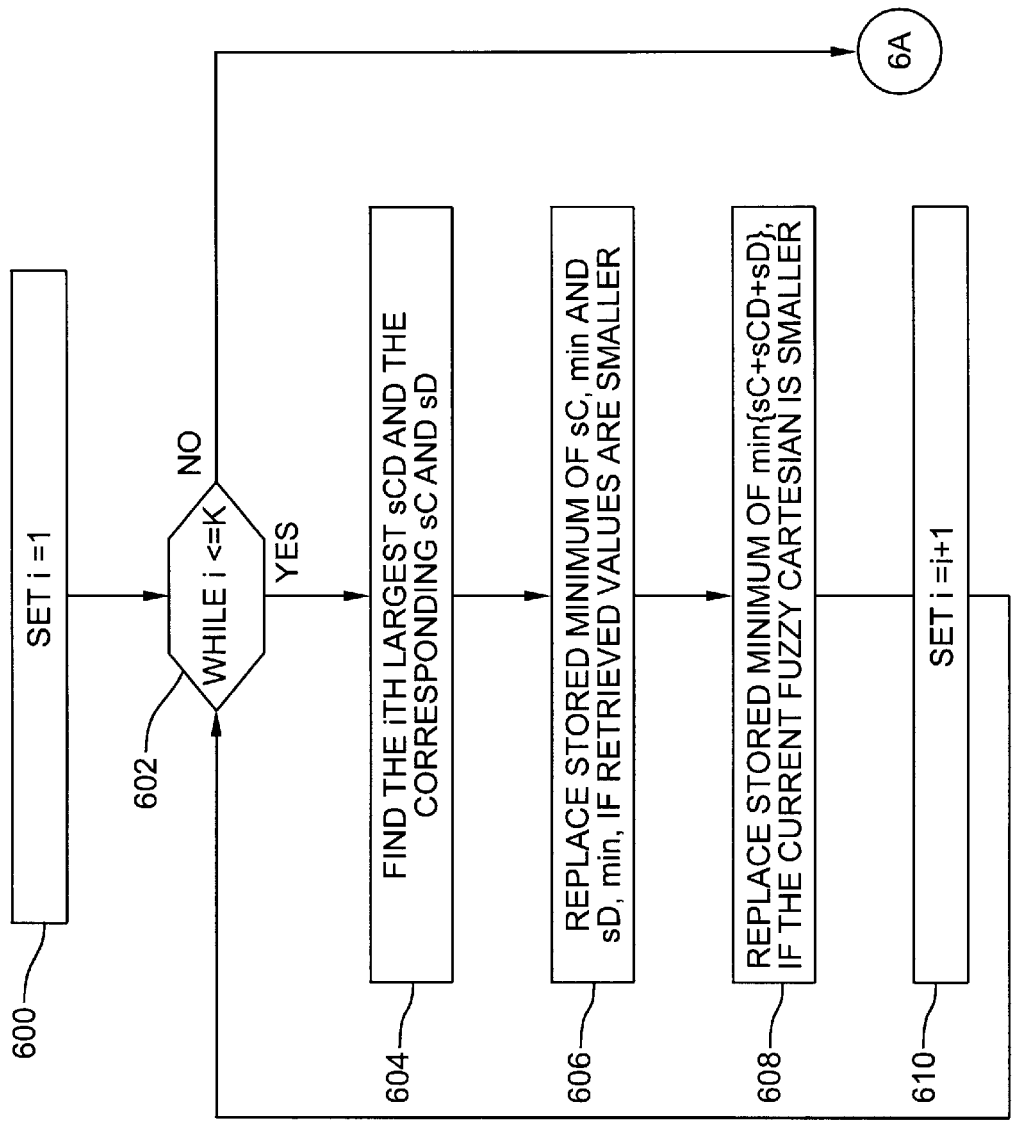
FIGS. 6A and 6B provide a flow diagram of the pruning procedure of two objects according to an embodiment of the present invention.
Figure 6B:
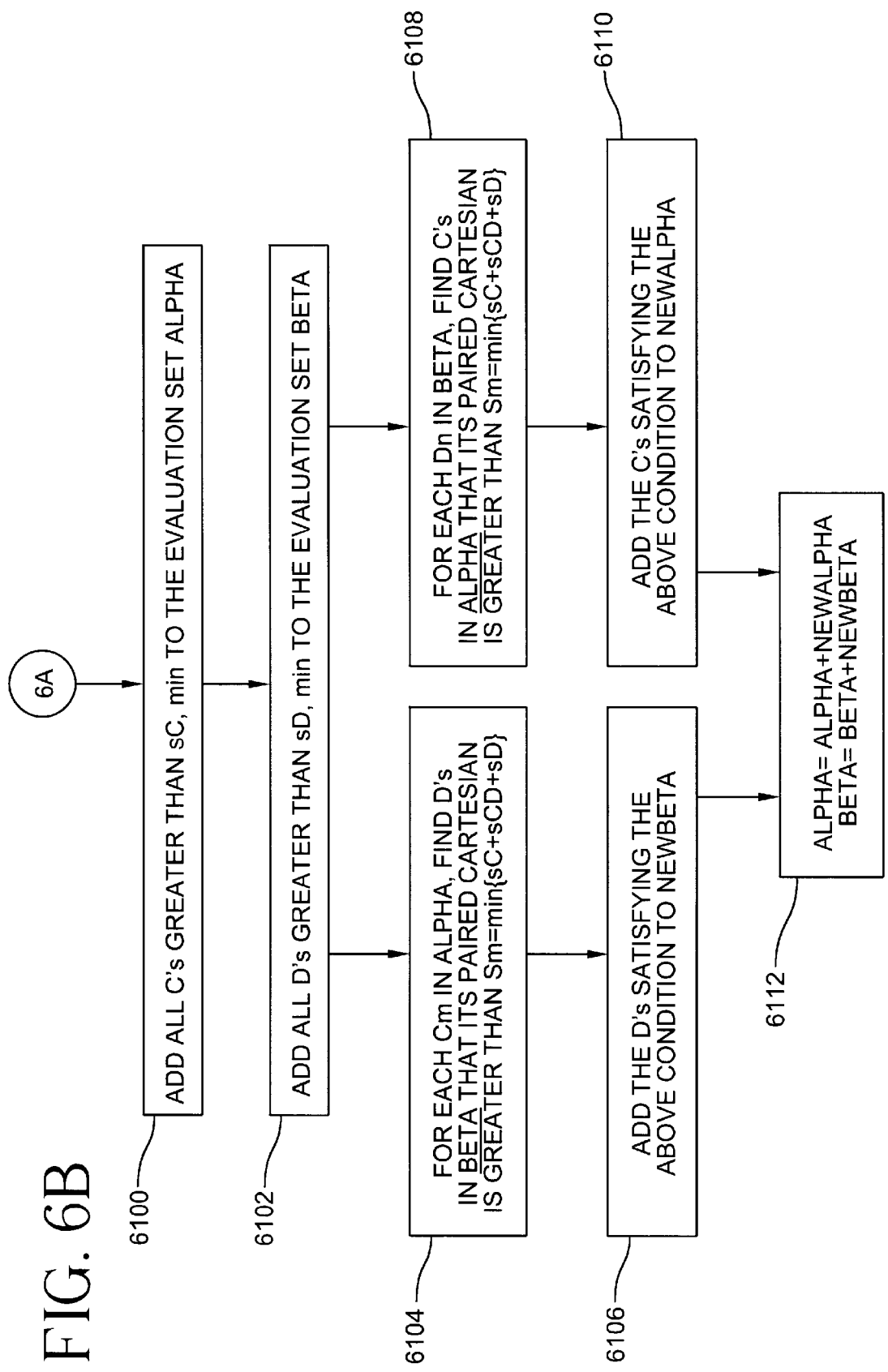

FIGS. 6A and 6B provide a flow diagram of the pruning algorithm of candidate lists of two objects according to an embodiment of the present invention. We singled out two-object pruning because it requires less stringent constraints and provides more effective pruning, compared to multi-object pruning. Multi-object pruning is based on two-object pruning with additional constraints.

There are two stages in the two-object pruning algorithm. FIG. 6A illustrates the first stage, in which a lower bound of the Kth largest path metric is established. FIG. 6B illustrates the second stage, in which candidates with the possibility of having a larger path metric than the lower bound are added to the evaluation set.

The algorithm starts at step 600, in which the loop variable i is initiated. When i is less than or equal to the target number K, the loop continues (step 602). In step 604, the algorithm asks for the ith largest fuzzy relation score, sCD. This score corresponds to the link between a dot in object C's candidate list, denoted as Cm, and a dot in D's list, denoted as Dn. Both Cm and Dn have fuzzy scores. They are compared to the smallest fuzzy scores retrieved so far from C's and D's lists, sC,min and sD,min, respectively (step 606). If the retrieved values are smaller, they replace sC,min or sD,min. Without loss of generality, in this flow diagram, their fuzzy cartesian score (path metric) is defined as the sum of sC, sCD, and sD. The path metric of retrieved Cm and Dn is compared to the smallest cartesian score so far, min{sC+sCD+sD} (step 608). If it is smaller, the minimum cartesian score is replaced. Note that steps 606 and 608 are evaluated independent of each other. It is possible to replace sC,min without changing min{sC+sCD+sD}, and vice versa. The loop continues until i reaches K+1.

In FIG. 6A, the first stage of the two-object pruning algorithm establishes a lower bound of the Kth largest path by locating the minimum cartesian score of the top-K relations. In FIG. 6B, the algorithm proceeds to retrieve all objects that may have larger path metrics than this lower bound.

The algorithm first adds all candidates in C's list with a fuzzy score greater than sC,min, established in FIG. 6A, to the evaluation set ALPHA (6100). Similarly, it adds all candidates in D's list with a fuzzy score greater than sD,min to the evaluation set BETA (6102). ALPHA is a subset of C's list. ALPHA is its complement. Similarly, BETA is a subset of D's list. BETA is its complement. At this point, we cannot guarantee that the final top-K paths will only appear in the cartesian formed by ALPHA and BETA. We are able to guarantee, however, that the final top-K paths will not appear in the cartesian formed by ALPHA and BETA. Then, how about the cartesians of ALPHA and BETA, as well as ALPHA and BETA?

It is to be appreciated that a candidate list may be viewed as a set. In this set, its members are divided into two subsets, A and A'. In accordance with set theory terminology, the union of A and A' is the complete set. A is the complement set of A'. A' is the complement set of A. Herein, the complement set is denoted by underlining the name of the set.

Steps 6104, 6106, 6108, and 6110 are performed to capture any path in the top-K that might fall in the cartesians of ALPHA and BETA, as well as ALPHA and BETA. Since the procedures are symmetric, FIG. 6B shows the steps in parallel blocks. For each candidate Cm in ALPHA, find any Dn in BETA such that their cartesian score is greater than the established minimum min{sC+sCD+sD} in FIG. 6A (6104). Those Dn's that satisfy the condition form a new set, named NEWBETA (6106). Similarly, for each candidate Dn in BETA, find any Cm in ALPHA such that their cartesian score is greater than min{sC+sCD+sD} (6108). Those Cm's that satisfy the condition form a new set, named NEWALPHA (6110).

Finally, ALPHA is merged with NEWALPHA and forms the evaluation set of object C. BETA is merged with NEW-BETA and forms the evaluation set of object D (6112). The two-object pruning algorithm ends and one can show the final top-K paths will be in the cartesian of the newly merged ALPHA and BETA. No false dismissal will happen.

Figure 7:
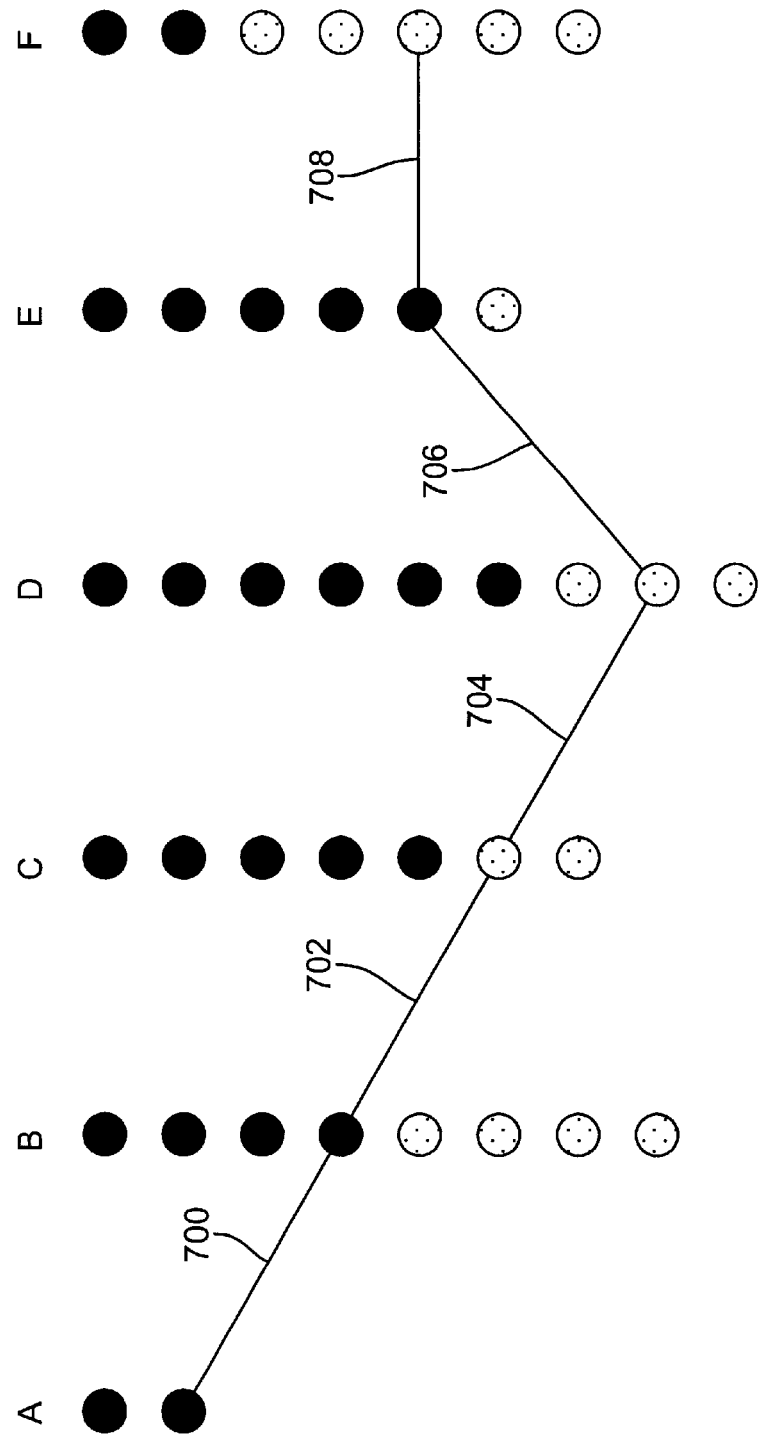
FIG. 7 is a graphical illustration of the multiple object pruning problem.

FIG. 7 illustrates the multi-object pruning problem, which is significantly more involved than two-object pruning. Direct extension of two-object pruning results cannot guarantee no false dismissal. FIG. 7 depicts a path with links marked 700, 702, 704, 706 and 708 connecting six candidates objects. Solid dots represent candidates remaining in the evaluation sets. Non-solid (shaded) dots represent candidates in the pruned sets. In this path, links 702, 704, 706, and 708 have one or both their terminals in the pruned sets. Only link 700 has both terminals in the evaluation set. The cartesian of evaluation sets can be written as A×B×C×D× E×F. In order to guarantee no false dismissal, the algorithm must ensure that for any segments of a path outside of the evaluation sets, there are at least K paths inside the evaluation sets with larger cartesian scores. This observation leads us to develop the following four conditions for each neighboring paired objects. In the example given by FIG. 7, A and B are a neighboring pair. So are B and C, C and D, D and E, E and F.

Assume query objects C and D are in the neighbor of each other in the query. Their evaluation sets are named ALPHA and BETA, respectively. If ALPHA and BETA satisfy the following conditions, there will be no false dismissal:

(i) the size of the set ALPHA (BETA) must be greater than K;

(ii) top-K pairs (for the cartesian of objects C and D only) are in the cartesian of the sets ALPHA and BETA;

(iii) for any Cm in ALPHA, there exists Dn in BETA such that the cartesian of Cm and Dn is greater than any paired cartesian in ALPHA and BETA; the same is true with respect to any Dn in BETA;

(iv) for any Cm in ALPHA, its cartesian with any Dn in BETA is always greater than its cartesian with any Dn in BETA; the same is true with respect to any Dn in BETA.

Condition (i) requires at least K candidates in the evaluation set. Condition (ii) requires that the cartesian of the two evaluation sets must have top-K pairs, if only the two objects are evaluated. Condition (ii) follows directly from the two-object pruning algorithm. Condition (iii) requires that any candidate in the evaluation set must have a cartesian that is greater than any pairs of cartesian in the pruned sets. Condition (iv) requires that, for any candidate in the evaluation set, its paired cartesian with a candidate in the other evaluation set must be greater than its paired cartesian with a candidate in the other pruned set.

Figure 8:
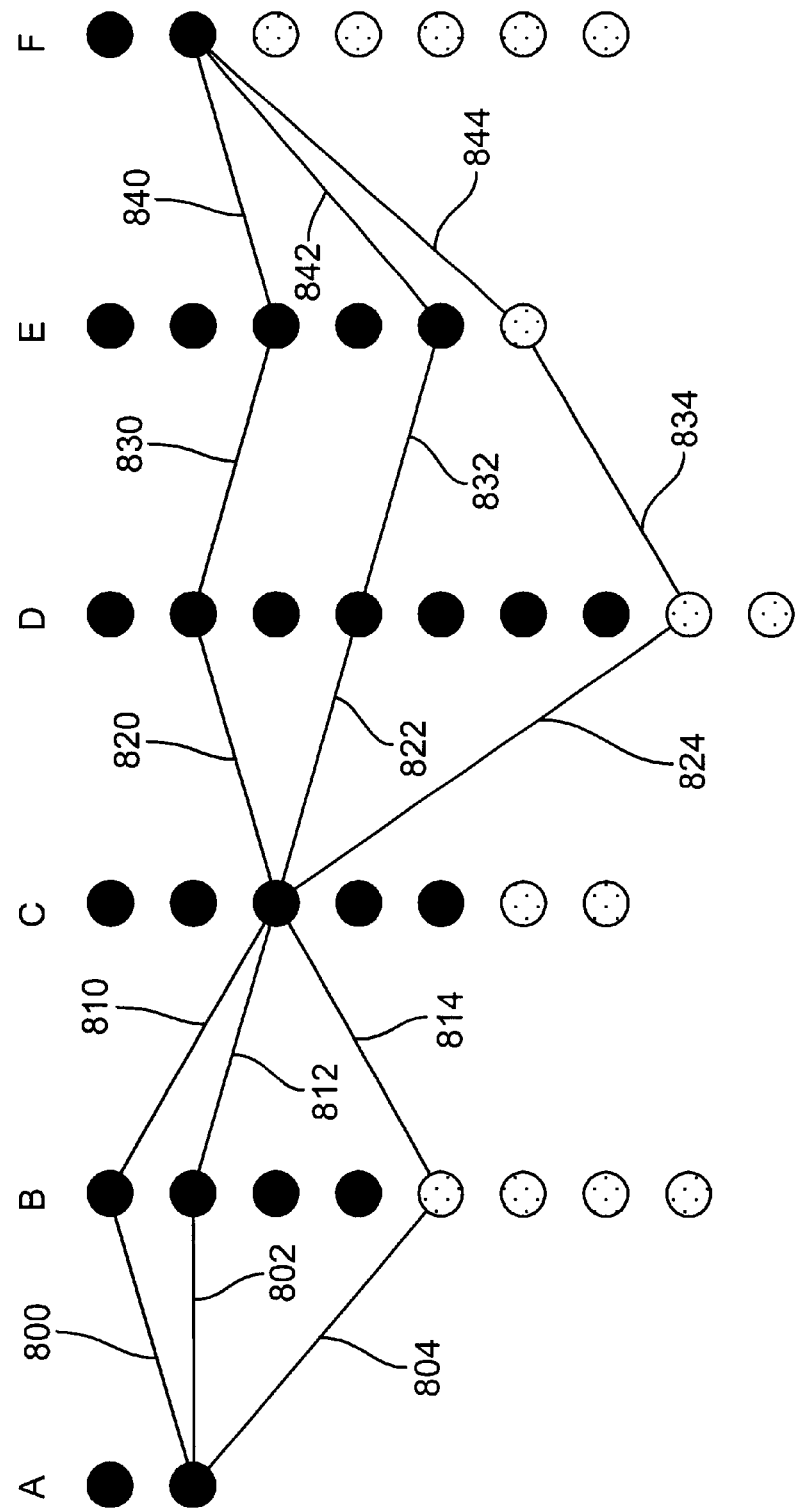
FIG. 8 is a graphical illustration of sufficient conditions needed to guarantee no false dismissal in multiple object pruning according to an embodiment of the present invention.

The above four conditions are best described in an example. FIG. 8 illustrates the use of the four conditions in multi-object pruning according to an embodiment of the present invention. For ease of illustration, we set K to two. Again, solid dots represent candidates remaining in the evaluation sets, while non-solid (shaded) dots represent candidates in the pruned sets. In FIG. 8, there is a path with links 804, 814, 824, 834, and 844. This path may be divided into two segments. The first segment consists of links 804 and 814. The second segment consists of 824, 834 and 844. Both segments start and end at dots in the evaluation sets but pass dots in the pruned sets. For each segment, we now show that there are at least K (K=2 in this example) segments with greater values in the evaluation set.

Starting with the 804-814 segment, invoke condition (iv) and we get links 800 and 802, both of which have greater values than 804. We then invoke condition (iii) to get links 810 and 812, both of which again have greater values than 814. We thus have two segments 800-810 and 802-812 that are greater than 804-814.

For the 824-834-844 segment, invoke condition (iv) to get links 820 and 822. Invoke condition (iii) to get links 830 and 832. Finally, invoke condition (iv) again to get 840 and 842. For each link in the segment, there are two links in the evaluation set with greater values. Therefore, we have two segments 820-830-840 and 822-832-842 that are greater than 824-834-844.

Since for any path passing through the pruned sets, one can invoke the four conditions to find K paths in the evaluation sets to defeat the outlier. This means the final top-K paths will definitely be in the cartesian of evaluation sets. Any pruning algorithm that satisfies the four conditions thus guarantees no false dismissal.

Figure 9A:
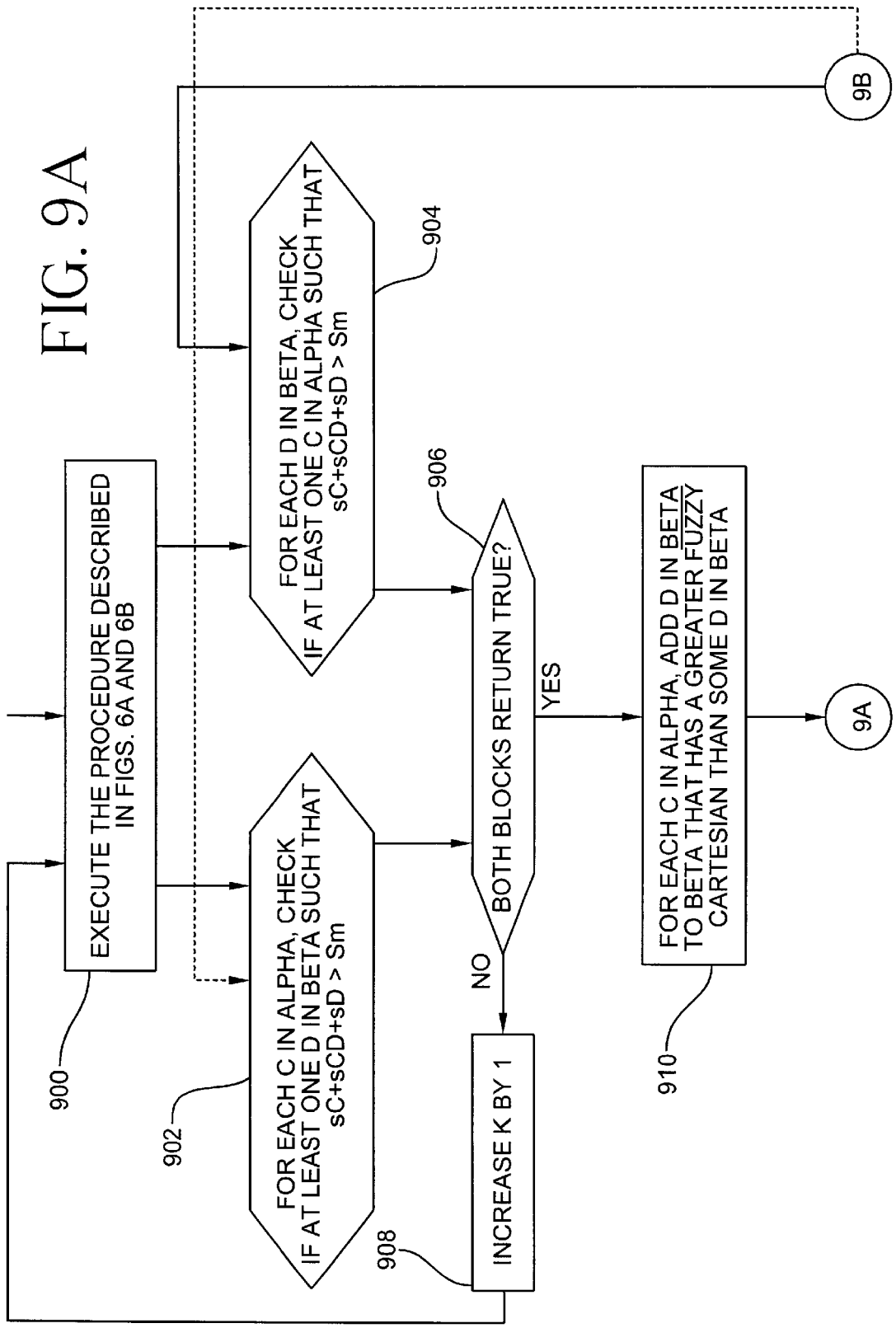

FIGS. 9A and 9B provide a flow diagram description of the pruning procedure for neighboring pairs according to an embodiment of the present invention. This algorithm should be interpreted as one way to implement the four sufficient conditions. Although it represents a preferred approach, it is to be noted that variations may achieve better performance, depending on software data structures.

In FIGS. 9A and 9B, the notations in FIGS. 6A and 6B are followed. The first step is in fact to execute the two-object pruning algorithm described in FIGS. 6A and 6B (900). Ensuring that at least K candidates are included, conditions (i) and (ii) are satisfied. The rest of the multi-object pruning algorithm involves several loops. Let Sm denote min{sC+ sCD+sD} from FIGS. 6A and 6B. First, check if for each Cm in ALPHA, there exists Dn in BETA whose cartesian score is greater than Sm (step 902). Here, Sm is used as the UPPER-bound of the cartesian of ALPHA and BETA. Similarly, check if for each Dn in BETA, there exists Cm in ALPHA whose cartesian score is greater than Sm (step 904). If any condition is not satisfied, Sm may be too high and should be lowered by increasing K (step 908). Step 900 will be re-executed with K increased by one. Note that the algorithm is stated in such fashion for clarity. Actual implementations do not require re-executing step 900 from the beginning. For example, one can cache intermediate results to start from step 604.

If step 906 returns yes (i.e., both steps 902 and 904 return a true), condition (iii) is satisfied.

Condition (iv) is the most stringent. Step 910 and 9100 add pruned candidates back into the evaluation set if their cartesian scores are greater than any in the evaluation set. That is, in step 910, for each C in ALPHA, add D in BETA to BETA that has a greater fuzzy cartesian than some D in BETA. Similarly, in step 9100, for each D in BETA, add C in ALPHA to ALPHA that has a greater fuzzy cartesian than some C in ALPHA. If there are no candidates moved from the pruned sets into the evaluation sets (step 9102), condition (iv) is satisfied and the algorithm stops (block 9104). Otherwise, the procedure goes back to steps 902 and 904 to verify that newly added candidates satisfy condition (iii) (step 9106).

Finally, after each paired objects go through the algorithm depicted in FIGS. 9A and 9B, they need to be concatenated together like the graph shown in FIG. 8. The evaluation lists of object B for the paired objects A-B and B-C must match. The same is true for C pairs in B-C and C-D. One simply takes the union of the evaluation lists when they do not match. Newly added candidates need to be again validated through steps 902 and 904.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of pruning a search space of a composite object associated with a ranked fuzzy cartesian query, the method comprising the steps of:

obtaining at least two simple objects associated with the composite object, the at least two simple objects being characterized by respective lists of one or more candidates associated with the simple objects, the candidates of the at least two lists having relations respectively therebetween which are defined in accordance with a fuzzy specification, wherein each candidate in one of the lists, each candidate in the other of the lists and the relation therebetween form a path;

calculating a metric for at least a subset of the paths formed by the candidates and relations and identifying the paths having the top-K ranked path metrics; and removing candidates from the at least two lists which are not associated with the paths having the top-K ranked path metrics such that a pruned composite object is formed that may be used in a fuzzy cartesian query evaluation operation.

2. The method of claim 1, wherein the metric calculating step comprises the steps of:

obtaining a fuzzy object score for each candidate in the at least two lists; and determining a minimum fuzzy object score for each list.

3. The method of claim 2, wherein the metric calculating step further comprises the steps of:

obtaining a fuzzy relation score for a relation between a pair of candidates from the at least two lists; and determining a minimum fuzzy relation score.

4. The method of claim 3, wherein the metric calculating step further comprises the step of using the minimum fuzzy object score and the minimum fuzzy relation score to identify the paths having the top-K ranked path metrics.

5. The method of claim 1, wherein the metric calculating step further comprises the steps of:

determining an evaluation set of candidates for a first one of the lists and an evaluation set for the second one of the lists, the respective evaluation sets including respective candidates associated with the paths having the top-K ranked path metrics;

generating complementary sets from the evaluation sets, respectively;

determining whether a path metric associated with a candidate in the first one of the evaluation sets and a candidate in the complementary set of the second one of the evaluation sets is not less than the minimum path metric;

determining whether a path metric associated with a candidate in the second one of the evaluation sets and a candidate in the complementary set of the first one of the evaluation sets is not less than the minimum path metric; and ensuring that candidates associated with the path metrics that are not less than the minimum path metric are not removed from the at least two lists.

6. The method of claim 1, wherein the composite object is represented by at least three simple objects, each of the at least three simple objects being characterized by respective lists of one or more candidates associated with the simple objects, the candidates of the at least three lists having relations respectively between neighboring lists which are defined in accordance with a fuzzy specification, wherein each candidate in a first one of the lists, each candidate in a second one of the lists, each candidate in a third one of the lists, and the relations therebetween form a path.

7. The method of claim 6, further comprising the step of verifying that, for any portion of a path having removed candidates, there are at least K paths remaining in the pruned composite object with larger path metrics than the portion of the path having removed candidates.

8. The method of claim 7, wherein the verifying step is satisfied for a pairing of neighboring candidate lists, wherein the first list forms a neighboring pairing with the second list and the second list forms neighboring pairing with the third list, when the size of each of the neighboring candidate lists, after the removing operation, is greater than K.

9. The method of claim 8, wherein the verifying step is satisfied for a pairing of neighboring candidate lists, wherein the first list forms a neighboring pairing with the second list and the second list forms neighboring pairing with the third list, when the top-K ranked paths of the pairing are not removed.

10. The method of claim 9, wherein the verifying step is satisfied for a pairing of neighboring candidate lists, wherein the first list forms a neighboring pairing with the second list and the second list forms neighboring pairing with the third list, when for any candidates in one of the lists of a pairing formed after the removing operation, there exists a candidate in the other list of the pairing formed after the removing operation such that the path metric associated with the two candidates is greater than any path metric associated with complements of the two lists formed after the removing operation.

11. The method of claim 10, wherein the verifying step is satisfied for a pairing of neighboring candidate lists, wherein the first list forms a neighboring pairing with the second list and the second list forms neighboring pairing with the third list, when, for any candidates in one of the lists of a pairing after the removal operation, its path metric with any candidate in the other list of the pairing after the removal operation is greater than its path metric any candidate list in a complement of the other list.

12. Apparatus for pruning a search space of a composite object associated with a ranked fuzzy cartesian query, the apparatus comprising:

at least one processor operative to: (i) obtain at least two simple objects associated with the composite object, the at least two simple objects being characterized by respective lists of one or more candidates associated with the simple objects, the candidates of the at least two lists having relations respectively therebetween which are defined in accordance with a fuzzy specification, wherein each candidate in one of the lists, each candidate in the other of the lists and the relation therebetween form a path; (ii) calculate a metric for at least a subset of the paths formed by the candidates and relations and identify the paths having the top-K ranked path metrics; and (iii) remove candidates from the at least two lists which are not associated with the paths having the top-K ranked path metrics such that a pruned composite object is formed that may be used in a fuzzy cartesian query evaluation operation.

13. The apparatus of claim 12, wherein the metric calculating operation comprises: (i) obtaining a fuzzy object score for each candidate in the at least two lists; and (ii) determining a minimum fuzzy object score for each list.

14. The apparatus of claim 13, wherein the metric calculating operation further comprises: (i) obtaining a fuzzy relation score for a relation between a pair of candidates from the at least two lists; and (ii) determining a minimum fuzzy relation score.

15. The apparatus of claim 14, wherein the metric calculating operation further comprises using the minimum fuzzy object score and the minimum fuzzy relation score to identify the paths having the top-K ranked path metrics.

16. The apparatus of claim 12, wherein the metric calculating operation further comprises: (i) determining an evaluation set of candidates for a first one of the lists and an evaluation set for the second one of the lists, the respective evaluation sets including respective candidates associated with the paths having the top-K ranked path metrics; (ii) generating complementary sets from the evaluation sets, respectively; (iii) determining whether a path metric associated with a candidate in the first one of the evaluation sets and a candidate in the complementary set of the second one of the evaluation sets is not less than the minimum path metric; (iv) determining whether a path metric associated with a candidate in the second one of the evaluation sets and a candidate in the complementary set of the first one of the evaluation sets is not less than the minimum path metric; and (v) ensuring that candidates associated with the path metrics that are not less than the minimum path metric are not removed from the at least two lists.

17. The apparatus of claim 12, wherein the composite object is represented by at least three simple objects, each of the at least three simple objects being characterized by respective lists of one or more candidates associated with the simple objects, the candidates of the at least three lists having relations respectively between neighboring lists which are defined in accordance with a fuzzy specification, wherein each candidate in a first one of the lists, each candidate in a second one of the lists, each candidate in a third one of the lists, and the relations therebetween form a path.

18. The apparatus of claim 17, wherein the at least one processor is further operative to verify that, for any portion of a path having removed candidates, there are at least K paths remaining in the pruned composite object with larger path metrics than the portion of the path having removed candidates.

19. The apparatus of claim 18, wherein the verifying operation is satisfied for a pairing of neighboring candidate lists, wherein the first list forms a neighboring pairing with the second list and the second list forms neighboring pairing with the third list, when the size of each of the neighboring candidate lists, after the removing operation, is greater than K.

20. The apparatus of claim 19, wherein the verifying operation is satisfied for a pairing of neighboring candidate lists, wherein the first list forms a neighboring pairing with the second list and the second list forms neighboring pairing with the third list, when the top-K ranked paths of the pairing are not removed.

21. The apparatus of claim 20, wherein the verifying operation is satisfied for a pairing of neighboring candidate lists, wherein the first list forms a neighboring pairing with the second list and the second list forms neighboring pairing with the third list, when for any candidates in one of the lists of a pairing formed after the removing operation, there exists a candidate in the other list of the pairing formed after the removing operation such that the path metric associated with the two candidates is greater than any path metric associated with complements of the two lists formed after the removing operation.

22. The apparatus of claim 21, wherein the verifying operation is satisfied for a pairing of neighboring candidate lists, wherein the first list forms a neighboring pairing with the second list and the second list forms neighboring pairing with the third list, when, for any candidates in one of the lists of a pairing after the removal operation, its path metric with any candidate in the other list of the pairing after the removal operation is greater than its path metric any candidate list in a complement of the other list.

23. An article of manufacture for pruning a search space of a composite object associated with a ranked fuzzy cartesian query, comprising a machine readable medium containing one or more programs which when executed implement the steps of:

obtaining at least two simple objects associated with the composite object, the at least two simple objects being characterized by respective lists of one or more candidates associated with the simple objects, the candidates of the at least two lists having relations respectively therebetween which are defined in accordance with a fuzzy specification, wherein each candidate in one of the lists, each candidate in the other of the lists and the relation therebetween form a path;

calculating a metric for at least a subset of the paths formed by the candidates and relations and identifying the paths having the top-K ranked path metrics; and removing candidates from the at least two lists which are not associated with the paths having the top-K ranked path metrics such that a pruned composite object is formed that may be used in a fuzzy cartesian query evaluation operation.

* * * * *